United States Patent [19]

Roberts et al.

[11] 4,221,254

[45] Sep. 9, 1980

[54] TREAD FOR PNEUMATIC TIRE

[75] Inventors: Charles W. Roberts, Akron; Michael A. Kolowski, Tallmadge; Daniel J. Lindner, North Canton; John E. Lynch, Bedford; Terrence M. Ruip, Akron, all of Ohio; Harold D. Fetty, Birmingham, Mich.

[73] Assignee: The Goodyear Tire & Rubber Company, Akron, Ohio

[21] Appl. No.: 877,784

[22] Filed: Feb. 14, 1978

[51] Int. Cl.² ............................................. B60C 11/00
[52] U.S. Cl. ................................ 152/209 D; D12/138
[58] Field of Search ............... 152/209 R, 209 D, 374; D12/134–151

[56] References Cited

U.S. PATENT DOCUMENTS

| 2,908,312 | 10/1959 | Olsen | 152/209 R |
| 3,512,567 | 5/1970 | Verdier | 152/209 R |
| 3,998,256 | 12/1976 | Verdier | 152/209 R |
| 4,006,767 | 2/1977 | Ford | 152/374 |

Primary Examiner—John J. Love
Assistant Examiner—D. W. Underwood
Attorney, Agent, or Firm—Frank Pincelli

[57] ABSTRACT

A tread for a pneumatic tire having a plurality of circumferentially spaced independent projections, each projection has an outer configuration which is basically triangular as viewed in a plane perpendicular to the tread. The projections in the central portion of the tread are oriented such that the leading edges form an angle from about 30° to 60° with respect to the mid-circumferential plane of the tire, and the projections in the shoulder portions are oriented such that the leading edges form an angle from about 30° to 70° with respect to the mid-circumferential plane of the tire.

11 Claims, 2 Drawing Figures

TREAD FOR PNEUMATIC TIRE

The foregoing abstract is not to be taken as limiting the invention of this application, and in order to understand the full nature and extent of the technical disclosure of this application, reference must be made to the accompanying drawings and the following detailed description.

BACKGROUND OF THE INVENTION

This invention relates to pneumatic tires and more particularly to an improved tread for tires. It is well known in the tire industry that the choice of a particular tread involves trade-off between tire performance chatertistics in order to achieve the overall desired tire performance. Among such characteristics are those directed to wear, comfort, noise, handling under various road conditions, fuel consumption and the like. The foregoing performance characteristics are generally at odds with each other for any given tread design. For example, a tread which has good wet traction or good snow traction is generally obtained at the expense of dry road performance, handling tread wear and/or noise production; a tread which has good tread wear is generally obtained at the expense of wet traction, ride, snow traction and/or comfort; a tread which has good fuel consumption is generally obtained at the expense of wear and/or traction. Due to complex interaction between these performance characteristics, it is difficult to obtain a tread which can exhibit good wet and snow traction characteristics while still maintaining good tread wear, dry traction, handling and noise levels.

Applicants have discovered a particular arrangement by which good wet and snow traction characteristics can be obtained while obtaining acceptable levels of tread wear, handling, dry road performance, fuel consumption and noise production.

SUMMARY OF THE PRESENT INVENTION

A tire made in accordance with the present invention is provided with a plurality of independent buttons or projections spaced circumferentially about the tire. The projections have an outer configuration which is substantially triangular as viewed in a plane perpendicular to the tread. The leading edges of th e projections in the central portion of the tread are oriented at an angle from about 30° to 60° with respect to the mid-circumferential plane of the tire. The leading edges of the projections in the shoulder areas of the tire are oriented at an angle from about 30° to 70° with respect to the mid-circumferential plane of the tire, preferably at least one of the leading edges of the projections in the shoulder area form an angle of at least 40°.

DETAILED DESCRIPTION OF THE INVENTION

Figure 1:
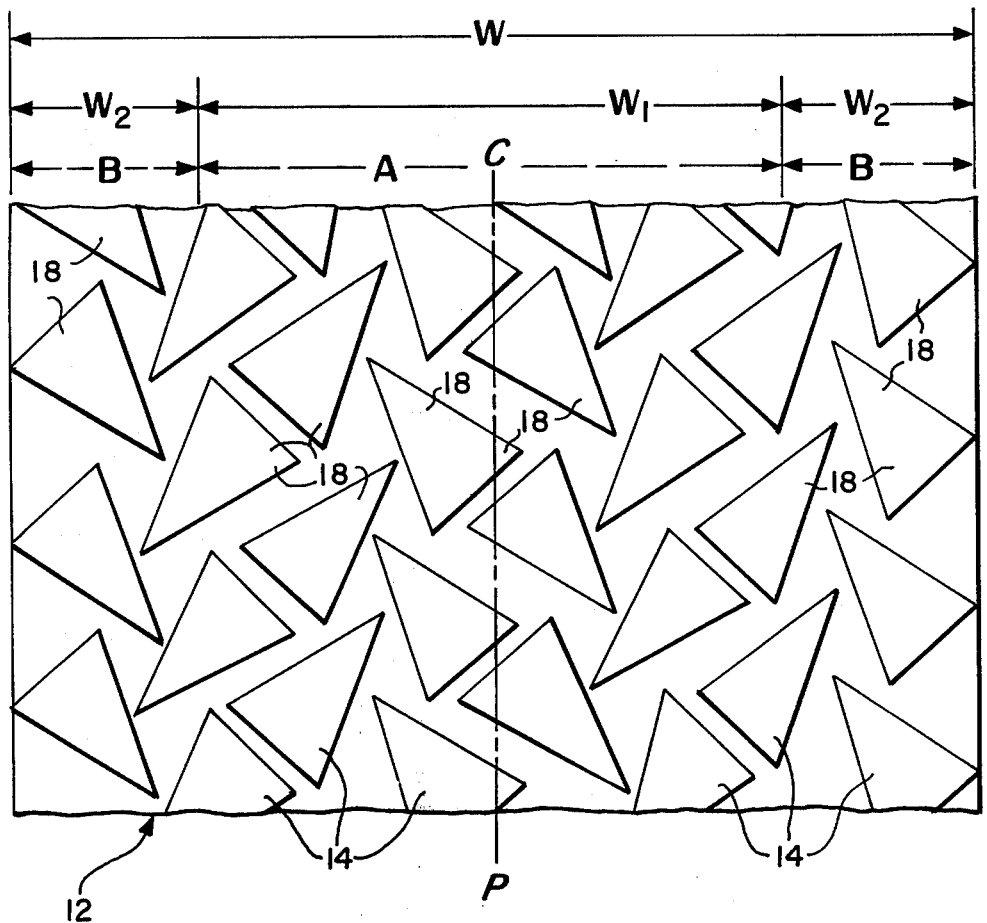
FIG. 1 is a fragmentary plan view of a tread of a pneumatic tire made in accordance with the present invention.

Referring to FIG. 1, there is illustrated a fragmentary plan view of a tread 12 on a tire made in accordance with the present invention. The tread 12 comprises of a plurality of independent spaced buttons or projections 14 placed circumferentially about the tire. For the purpose of this invention an independent projection shall be considered a projection which has a length substantially less than the length of the footprint of the tire, preferably, less than 50% of the length of the footprint. The use of independent projections in the tread contribute to the efficient removal of water from the footprint of the tire by providing passageways for the escape of water from between the tread and the road surface. Additionally, the use of independent projections enhances penetration of the tread in snow and avoids the flotation effect experienced by solid rib tires.

Figure 2:
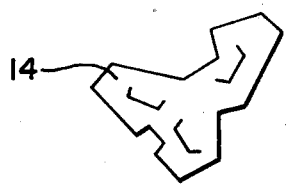
FIG. 2 is an enlarged fragmentary view of a modified form of one of the projections shown in FIG. 1.

Referring to FIG. 2, the projections 14 have an outer configuration which is substantially that of a triangle. The triangular configuration provides a high amount of gripping edges for the amount of surface area and is highly efficient in wet traction. The triangular configuration further provides stability of the tread in the longitudinal direction during normal straight-on travel and also provides good stability in the axial directions during turning maneuvers.

In order to obtain good wet traction, it is necessary to remove the fluid from the footprint of the tire as quickly and efficiently as possible. In order to obtain efficient removal of water in the footprint of the tire, it is necessary to break down the thin viscous layer of fluid found therein. This can be accomplished by causing change in velocity of the fluid. By properly orienting the leading edges of the projections 14, the desired change in velocity may be obtained. For the purposes of this invention the leading edges of the projections shall be considered to be the edge or edges which first contact the road surface during normal operation of the vehicle on which the tire is mounted. Since tires are generally designed to be rotated in either direction, all the edges are individual leading edges. However, if a tire is made for rotation in one direction only, the leading edge need be properly oriented. If the orientation of the leading edges form a low angle with respect to the mid-circumferential plane of the tire, the viscous layer will not easily be broken up. If the leading edges are substantially perpendicular to the direction of travel, the efficiency of water removal is greatly reduced at relatively high speeds. By proper orientation of the leading edges of the triangular projections, a tread can be obtained which is good in wet traction while still maintaining good wear and stability characteristics.

The tread 12 is divided into three circumferentially extending zones, central zone A and two shoulder zones B and C. The projections 14 in the central zone are oriented such that the leading edges 18 are oriented such that they form an angle from about 30° to 60° with respect to the mid-circumferential plane CP of the tire; preferably, 45°. The width $W_1$ of the central zone A may range from 60% to 80% of the width W of the tread 12, preferably about 70%. In the preferred embodiment the central zone is located such that the axial edges extend axially outward from the mid-circumferential plane an equal distance. For the purpose of this invention, the tread width W is determined from the footprint of the tire mounted on a rim for which it is designed, inflated to design inflation pressures and at rated load.

The portion of the tread axially outward of said central zone define shoulder zones B and C. Alternately stated, the width $W_2$ of each shoulder zone B and C is equal to the tread width W minus the width $W_1$ of zone A, divided by 2 $[W-W_1/2]$.

The leading edges 18 of projections 14 in shoulder zones B and C form an angle with respect to the mid-circumferential plane CP from about 30° to 70°.

For good wet and snow traction it is desirable that at least one of the leading edges 18 in the shoulder zones form an angle from about 30° to 70° with respect to the mid-circumferential plane CP, preferably about 60°.

Handling characteristics of the tread 12 may be further improved by providing additional gripping edges in the projections 14. Referring to FIG. 2, a modified form of projections 14 is illustrated, projections 14 are further provided with a plurality of grippiing notches in each side thereto. While only one variation of the basic triangular shape is illustrated, various other modified forms may be made in accordance with the present invention.

Projection 14 may be further provided with a plurality of sipes 18 to further maximize traction of the tread 12. In the embodiment illustrated in FIG. 2, three sipes are placed in each projection 14, one in the general area of each corner.

Projection 14 of the tread 12 should be made of an elastomeric material having a modulus of at least 7.5 meganewtons/m$^2$, at 300% elongation preferably at least 8.7 meganewtons/m$^2$ at 300% elongation.

The tread 12 illustrated has a net to gross non-skid of less than 65%, preferably between 65% and 50%. For the purposes of this invention, net to gross non-skid shall be considered to be the net contact area (i.e., the total contact area less the void area provided by the grooves) of the tread with the road surface as a percentage of the total contact area.

While certain representative embodiments and details have been shown for the purpose of illustrating the invention, it will be apparent to those skilled in this art that various changes and modifications may be made therein without departing from the spirit or scope of the invention.

What is claimed is:

1. A tread for a pneumatic tire consisting of a plurality of independent spaced buttons or projections placed circumferentially about said tire, the outer configuration of said projections as viewed in a plane perpendicular to the surface of said tire is substantially that of a triangle, said tread is divided into a central zone and two axially opposed shoulder zones which extend circumferentially about said tire, said shoulder zones extend from the longitudinal edges of said central zone axially outward to the tread edges of said tire, central zone having a width ranging from about 60% to 80% of the width of said tread, all the edges of said projections in said central zone are oriented such that they form an angle with respect to the mid-circumferential plane of the tire from about 30° to 60°, said projections in said shoulder zone of said tread oriented such that all the edges of said projections form an angle with respect to the mid-circumferential plane of the tire from about 30° to 70°.

2. A tread according to claim 1 wherein said central zone extends axially outward from said mid-circumferential plane an equal distance on either side.

3. A tread according to claim 1 wherein said central zone has a width equal to about 70% of said tread width.

4. A tread according to claim 1 wherein at least one of said edges of said projections in said central zone is a leading edge and oriented at an angle of about 45° with respect to the mid-circumferential plane of said tire.

5. A tread according to claim 1 wherein at least one of said edges of said projections in said shoulder zones is a leading edge and oriented at an angle of about 60°.

6. A pneumatic tire according to claim 1 wherein said tread of said tire is made from elastomeric material having a modulus of at least 7.5 meganewtons/m$^2$.

7. A pneumatic tire according to claim 6 wherein said tread is made from elastomeric material having a modulus of approximately 8.7 meganewtons/m$^2$.

8. A tread for a pneumatic tire consisting of a plurality of independent spaced buttons or projections placed circumferentially about said tire, the outer configuration of said projections as viewed in a plane perpendicular to the surface of said tread is substantially that of a triangle, said tread is divided into a central zone and two axially opposed shoulder zones which extend circumferentially about said tire, said shoulder zones extend from the longitudinal edges of said central zone axially outward to the tread edges of said tire, said central zone having a width ranging from about 60% to 80% of the width of said tread, all the edges of said projections in said central zone are oriented such that they form an angle with respect to the mid-circumferential plane of the tire from about 30° to 60°, said projections in said shoulder zone of said tread oriented such that all the edges of said projections form an angle with respect to the mid-circumferential plane of the tire from about 30° to 70°, said tread having a net to gross less than 65% and being made from an elastomeric material having a modulus of at least 7.5 meganewtons/m$^2$.

9. A tread according to claim 8 wherein said central zone has a width equal to about 70% of said tread width.

10. A tread according to claim 8 wherein at least one of said edges of said projections in said central zone is a leading edge and oriented at an angle of about 45° with respect to the mid-circumferential plane of said tire.

11. A tread according to claim 8 wherein at least one edge of said projections in said shoulder zones is oriented at an angle of about 60°.

* * * * *